W. K. HALL.
Mowing Machine.
No. 10,267.
Patented Nov. 22, 1853.
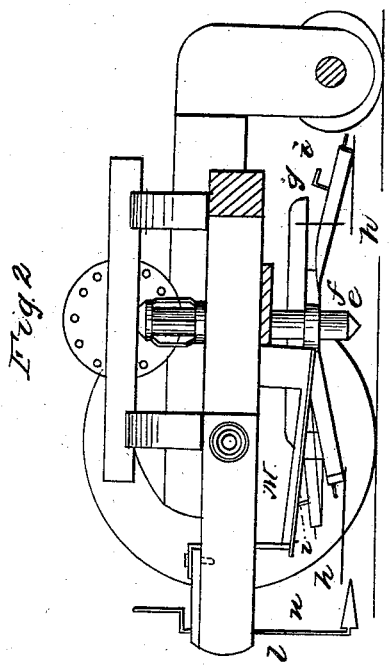
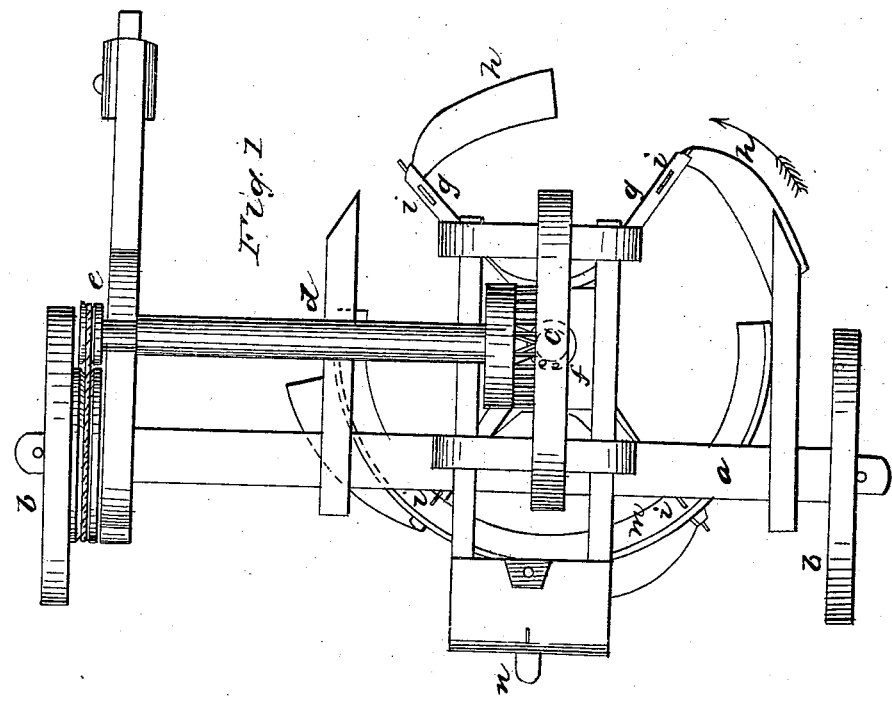

UNITED STATES PATENT OFFICE.

WILLIAM K. HALL, OF PHILLIPPI, VIRGINIA.

IMPROVEMENT IN GRASS-HARVESTERS.

Specification forming part of Letters Patent No. 10,267, dated November 22, 1853.

*To all whom it may concern:*

Be it known that I, WILLIAM K. HALL, of Phillippi, in the county of Barbour and State of Virginia, have invented a new and useful Improvement in Mowing-Machines; and I do hereby declare that the following is a full, clear, and exact description of the construction and operation of the same, reference being had to the annexed drawings, forming part of this specification, in which—

Figure 1 is a top view of the machine, and Fig. 2 a side elevation of the same.

Similar letters of reference in the several figures denote the same part of the machine.

My invention refers to improvements upon moving machines in which horizontal blades attached to arms revolve around a vertical shaft. It consists in attaching to the frame of the machine a semicircular tram slightly elevated in the rear, upon which staples attached to the arms run, after the cut is made, for the purpose of raising the knives above the surface of the ground while performing the rear portion of their revolution.

In the drawings, $a$ is the frame, running upon the driving-wheels $b$, which communicate motion to the vertical shaft $c$ through the horizontal shaft $d$ and pulley $e$. To the lower extremity of the shaft $c$ is attached the plate $f$, to which are fastened by hinges the arms $g$, so that they are capable of motion in a vertical direction. To the extremities of the arms $g$ are secured the blades $h$, having their outer edges sharpened for cutting. Suspended beneath the frame $a$ is the tram $m$, the rear portion of which is slightly elevated. Upon the upper faces of the arms $g$ are the staples $i$, which, as the arms revolve, catch on the depressed extremities of the tram $m$, and as the arm moves to the rear is elevated by the rise in the surface of the tram, carrying with it the arm attached, and raising the blade at the extremity of the same above the cut stubble and other obstacles. Through the rear bar of the frame $a$ passes the vertical bar $l$, having at its extremity the whetstone $n$, which, when properly adjusted will sharpen the edge of each blade as it rubs against the stone.

The operation of my machine is as follows: The revolution of the vertical shaft $c$ produces a corresponding revolution of the blades $h$, cutting the grass opposed to their progress as the machine moves forward. During the rear portion of the revolution of the blades they are elevated by the staples $i$, running upon the tram $m$, as above described. At the same time they are sharpened by rubbing against the whetstone $n$, placed in position by means of the rod $l$. This whetstone may be made circular, and the rod $l$ connected by gearing with the shaft $c$, so as to produce a rotary motion of the stone. The staples $i$ may also be furnished with rollers for facilitating the motion of the arms $g$ over the tram $m$.

The advantage of my improvement consists in the importance of raising the blades above the stubble and other obstacles with which it would necessarily come in contact during the rear portion of the revolution; and also in the fact that the machine is self-sharpening, requiring no stoppage and delay for putting the blades in order.

What I claim as my invention, and desire to secure by Letters Patent, is—

The tram $m$, in combination with the staples $i$ on the arms $g$, substantially as described, for the purposes specified.

In testimony whereof I have hereunto signed my name before two subscribing witnesses.

W. K. HALL.

Witnesses:
   GEO. PATTEN,
   JNO. OBER.